US 7,170,426 B2

(12) United States Patent
Tsui et al.

(10) Patent No.: US 7,170,426 B2
(45) Date of Patent: Jan. 30, 2007

(54) SYSTEMS AND METHODS FOR PROXIMITY CONTROL OF A BARRIER

(76) Inventors: Gallen Ka Leung Tsui, 17 Sheard Avenue, Brampton, Ontario (CA) L6Y 1J3; Philip Y. W. Tsui, 17 Sheard Avenue, Brampton, Ontariio (CA) L6Y 1J3

( * ) Notice: Subject to any disclaimer, the term of this patent is extended or adjusted under 35 U.S.C. 154(b) by 0 days.

(21) Appl. No.: 11/083,724

(22) Filed: Mar. 18, 2005

(65) Prior Publication Data
US 2005/0206519 A1    Sep. 22, 2005

Related U.S. Application Data (63) Continuation-in-part of application No. 10/944,093, filed on Sep. 16, 2004, and a continuation-in-part of application No. 10/875,343, filed on Jun. 23, 2004, now Pat. No. 7,088,265.

(60) Provisional application No. 60/554,725, filed on Mar. 18, 2004.

(51) Int. Cl.
*G08G 1/123* (2006.01)

(52) U.S. Cl. ............ 340/988; 340/539.13; 340/539.21; 340/539.23; 340/932.2

(58) Field of Classification Search ............ 340/539.11, 340/539.13, 539.14, 539.21, 539.23, 932.2, 340/988, 686.1, 686.6, 5.61; 709/227, 228, 709/300; 701/200
See application file for complete search history.

(56) References Cited

U.S. PATENT DOCUMENTS

| 4,535,333 A | 8/1985 | Twardowski |
|---|---|---|
| 4,623,887 A | 11/1986 | Welles, II |
| 4,626,848 A | 12/1986 | Ehlers |
| 4,771,283 A | 9/1988 | Imoto |
| 4,825,200 A | 4/1989 | Evans et al. |
| 4,878,052 A | 10/1989 | Schulze |
| 4,905,279 A | 2/1990 | Nishio |
| 4,928,098 A | 5/1990 | Dannhaeuser |
| 4,959,810 A | 9/1990 | Darbee et al. |
| 5,089,692 A | 2/1992 | Tonnesson |
| 5,227,780 A | 7/1993 | Tigwell |
| 5,379,453 A | 1/1995 | Tigwell |
| 5,442,340 A | 8/1995 | Dykema |
| 5,564,101 A | 10/1996 | Eisfeld et al. |
| 5,600,324 A | 2/1997 | Reed et al. |
| 5,619,190 A | 4/1997 | Duckworth et al. |
| 5,661,804 A | 8/1997 | Dykema et al. |
| 5,680,134 A | 10/1997 | Tsui |
| 5,686,903 A | 11/1997 | Duckworth et al. |
| 5,699,054 A | 12/1997 | Duckworth |
| 5,699,055 A | 12/1997 | Dykema et al. |
| 5,790,948 A | 8/1998 | Eisfeld et al. |

(Continued)

*Primary Examiner*—Van T. Trieu
(74) *Attorney, Agent, or Firm*—Crowell & Moring LLP (57) ABSTRACT

A system and method for proximity control of a barrier comprises a stationary wireless signal receiving device and a mobile transmitting device. The wireless signal receiving device may monitor at least one transmitting device within a predetermined coverage area and may be a radio frequency receiver or a spread spectrum receiver located near the barrier. In one embodiment, the transmitter device emits a control signal that is received by the receiving device when the transmitter is within a reception range. In one embodiment, the control signal includes transmitter identification information, directional information and position information. In another embodiment, the barrier is closed only after a predetermined delay has lapsed.

53 Claims, 9 Drawing Sheets

U.S. PATENT DOCUMENTS

| | | |
|---|---|---|
| 5,793,300 A | 8/1998 | Suman et al. |
| 5,815,086 A | 9/1998 | Ivie et al. |
| 5,841,390 A | 11/1998 | Tsui |
| 5,854,593 A | 12/1998 | Dykema et al. |
| 5,903,226 A | 5/1999 | Suman et al. |
| 5,923,758 A | 7/1999 | Khamharn et al. |
| 5,969,637 A | 10/1999 | Doppelt et al. |
| 5,990,828 A * | 11/1999 | King .................... 342/359 |
| 6,005,508 A | 12/1999 | Tsui |
| 6,008,735 A | 12/1999 | Chiloyan et al. |
| 6,025,785 A | 2/2000 | Farris et al. |
| 6,154,544 A | 11/2000 | Farris et al. |
| 6,161,005 A | 12/2000 | Pinzon |
| 6,169,492 B1 | 1/2001 | Dabbish |
| 6,243,000 B1 | 6/2001 | Tsui |
| 6,249,673 B1 | 6/2001 | Tsui |
| 6,327,570 B1 | 12/2001 | Stevens |
| 6,359,558 B1 | 3/2002 | Tsui |
| 6,388,559 B1 | 5/2002 | Cohen |
| 6,414,545 B1 * | 7/2002 | Zhang .................... 330/149 |
| 6,441,719 B1 | 8/2002 | Tsui |
| 6,556,813 B2 | 4/2003 | Tsui |
| 6,615,132 B1 | 9/2003 | Nagasaka et al. |
| 6,634,408 B2 | 10/2003 | Mays |
| 6,684,062 B1 * | 1/2004 | Gosior et al. .................. 455/73 |
| 6,742,037 B1 * | 5/2004 | Hall et al. .................. 709/228 |
| 6,823,188 B1 | 11/2004 | Stern |
| 6,904,000 B1 * | 6/2005 | Lee .................... 367/128 |
| 6,924,735 B2 | 8/2005 | Ueda et al. |
| 6,980,117 B1 * | 12/2005 | Kirkland et al. .......... 340/686.1 |
| 6,989,760 B2 * | 1/2006 | Dierking et al. .......... 340/686.1 |
| 2003/0043021 A1 | 3/2003 | Chung |

* cited by examiner

SYSTEMS AND METHODS FOR PROXIMITY CONTROL OF A BARRIER

CROSS-REFERENCE TO RELATED APPLICATION

This application is a continuation-in-part of U.S. patent application having Ser. No. 10/875,343 filed on Jun. 23, 2004 now U.S. Pat. No. 7,088,265, which claims the benefit of U.S. provisional patent application having Ser. No. 60/554,725, filed on Mar. 18, 2004. This application is also a continuation-in-part of U.S. patent application having Ser. No. 10/944,093 filed on Sep. 16, 2004.

FIELD OF THE INVENTION

The invention relates in general to systems and methods for proximity control of a barrier. In particular, the proximate location of an object to a barrier is identified, and the barrier is actuated when one or more conditions are met.

BACKGROUND

Automatic barrier operators such as a garage door opener or gate opener are used in many homes. These operators typically require the activation of a wireless transmitter in order to open or close the barrier. However, there are times that users may forget to activate the operator to close the barrier. Alternatively, it may not be convenient or safe for the driver to remove his/her hands from the steering wheel to activate the wireless transmitter.

Conventional barrier operators include, for example, U.S. Pat. No. 6,476,732 which describes how an approaching vehicle can activate a garage door using a Global Positioning System (GPS). A similar system incorporating GPS technology is also described in U.S. Pat. No. 6,615,132. GPS may be used to locate an object on earth through communication with satellites. There are however, several disadvantages in using such technology. Although GPS systems are widely available, it is rather expensive to employ this technology for barrier control operation. Another disadvantage in implementing GPS technology for such use is accuracy. Most consumer-grade GPS receivers are accurate to only within 50 feet, which means that an error of up to 50 feet may be expected. For applications such as garage door control, such a range of error may be unacceptable. For example, if an authorized vehicle is approaching a driveway that is 40 feet long, the door may not open even if the vehicle is on the driveway, since the range of error is 50 feet. Moreover, most driveways are less than 50 feet long. There are other sources of errors such as signal multi-path, orbital errors, Ionosphere and troposphere delays, receiver clock errors etc. Therefore, there is a need for a system and method that overcomes these disadvantages.

SUMMARY

Disclosed and claimed herein are systems and methods for proximity control of a barrier. In one embodiment, a method comprises storing user-defined position information in a memory of a stationary transceiver, which is coupled to a barrier control device which, in turn, controls a position of a barrier. The method further includes transmitting a control signal by a mobile transceiver, where the control signal includes identification information and position information and receiving the control signal by the stationary transceiver. In one embodiment, the method further includes comparing, by the stationary transceiver, the position information in the control signal to the user-defined position information, and, if there is a match, actuating the barrier control device. In another embodiment, the method includes transmitting a notification signal to the mobile transceiver indicating that the barrier control device is being actuated.

Other embodiments are disclosed and claimed herein.

DETAILED DESCRIPTION OF THE PREFERRED EMBODIMENT

One aspect of the invention involves a proximity barrier control system that comprises a stationary wireless signal receiving device. The signal receiving device may monitor at least one transmitting device within a predetermined coverage area. Such a receiving device may be a radio frequency receiver located near the barrier. The transmitting device may be a radio frequency transmitter attached to a mobile object, such as a vehicle or person. Since the radio frequency receiver is fixed at one location, in one embodiment the only time that the receiver receives signals from the transmitter is when the transmitter is within the reception range. In one embodiment, a barrier control mechanism, to which the receiver may be coupled, actuates the barrier when the transmitter is in close proximity. In yet another embodiment, multiple receiving devices may be used to monitor the position of the transmitting device. The use of multiple receiving devices may reduce the effect of interference and improve detection accuracy.

Another aspect of the invention involves a proximity barrier control system that comprises a stationary wireless transceiving device. The stationary transceiving device may monitor at least one additional transceiving device within a predetermined coverage area. In one embodiment, this additional transceiving device is a mobile device. For example, the mobile transceiving device may be a radio frequency device attached to a mobile object, such as a vehicle or person. Since the stationary transceiver is fixed at one location, in one embodiment the only time that the stationary transceiver receives signals from the mobile transceiver is when the mobile transceiver is within the reception range. In one embodiment, a barrier control mechanism, to which the stationary transceiver may be coupled, actuates the barrier when the mobile transceiver is in close proximity. In yet another embodiment, multiple stationary transceivers/receivers may be used to monitor the position of one or more mobile transceiving devices. The use of multiple transceivers may reduce the effect of interference and improve detection accuracy.

The invention may also include a signal strength indication device located at the receiver (or stationary transceiver) end and a direction indication device such as a compass, at the transmitter (or mobile transceiver) end. With the signal strength indication device, the receiver (or stationary transceiver) can tell not only whether the authorized object is within the reception range, but also how far the object is, based on the strength of the received signal. With the direction indication device (such as a compass), the receiver (or stationary transceiver) can determine whether an object (authorized or acknowledged by the transmitter or mobile transceiver) is traveling towards the receiver (or stationary transceiver) at the barrier, or away from the barrier. These additional features further enhance the reliability of the proximity barrier control. Similarly, multiple receiving devices (or stationary transceivers) may also be used to improve the reliability of the system and avoid localized interference.

In another embodiment, spread spectrum technology may be implemented. Spread spectrum technology is a wireless communication protocol which allows more reliable communication than the traditional narrow band frequency technique typically implemented in most conventional garage door operators. Spread spectrum technology involves continuous signal transmission at high transmission strength. By implementing spread spectrum technology, multiple devices may also be operated within one operational range, i.e. multiple vehicles in the same neighborhood with the proximity barrier control can be used at the same time. With narrow band radio frequency, interference occurs, causing multiple systems in the same operational range to malfunction. The use of spread spectrum also eliminates the possibility of code duplication. Therefore, continuous monitoring and continuous communication between the transmitter (or mobile transceiver) and the receiver (or stationary transceiver) is possible, resulting in a higher degree of reliability and stability.

Another aspect of the invention is a programming mode which allows the user to "train" the receiver (or stationary transceiver) to recognize the paths taken by the authorized object as it approaches and leaves the barrier. In one embodiment, the receiver (or stationary transceiver) has a memory device to memorize the signal strength and directional indication at various points along the path as the authorized object is approaching or leaving the barrier. During the operational mode, if these conditions cannot be met, the barrier will not be activated.

Yet another aspect of the invention is to incorporate a timing feature into one or more of the aforementioned embodiments. For example, with the proximity barrier control system referred to above, a timing mechanism may be used in conjunction with the barrier control mechanism to close the barrier automatically after it has been opened for a predetermined period of time. In another embodiment, rather than closing the barrier after the mobile object leaves the reception range, the timing mechanism may be used to delay the barrier's closing sequence for a predetermined amount of time.

Yet another aspect of the invention is to provide a proximity barrier control system that comprises at least one stationary wireless transceiver and at least one mobile wireless transceiver. When the stationary transceiver senses that the mobile transceiver is moving away from the barrier and is not longer within the reception range, the stationary transceiver may provide a notification signal to the mobile transceiver indicating that the barrier control mechanism is about to be actuated. In one embodiment, the transceiver senses that the mobile transceiver is moving away from the barrier and no longer in the reception range by using the signal strength indication device and/or the direction indication device described herein. It should equally be appreciated that the stationary transceiver may also provide a status signal to the mobile transceiver indicating the current positional status of the barrier (e.g., opened or closed).

In one embodiment, the notification signal may be an audible sound (e.g., a beep) or a visual indicator (e.g., a flashing LED) which lets a user of the mobile transceiver know that the barrier is about to close. In the case of a garage door and a vehicle equipped with a mobile transceiver, this feature will let the driver know that the garage door will in fact close even though the driver is driving away and unable to see it. In another embodiment, the user may be given the option of stopping the barrier from closing, or to just let the barrier close automatically.

The invention can also be applied to control devices other than a barrier operator. For example, depending on whether the object (such as an authorized vehicle or person) is approaching or leaving the receiver (or stationary transceiver), different actions or tasks can be assigned, such as turning on/off lights, arming/disarming security systems, changing the thermostat setting of heating/cooling system, locking/unlocking an electric deadbolt etc.

It should further be appreciated that the devices described herein may be equipped with Bluetooth technology. In such an embodiment, the only time that the receiver unit (or stationary transceiver) receives signals from the Bluetooth-equipped transmitter (or mobile transceiver) is when the Bluetooth-equipped transmitter (or mobile transceiver) is within the reception range of a Bluetooth-equipped receiver (or stationary transceiver). In one embodiment, the mobile Bluetooth-equipped transmitter/transceiver is a cellular phone or PDA which transmits a Bluetooth signal on a continuous basis. Alternatively, the Bluetooth-equipped cellular phone or PDA may transmit the Bluetooth signal on an intermittent basis, when manually activated, or at predetermined times.

Figure 1:
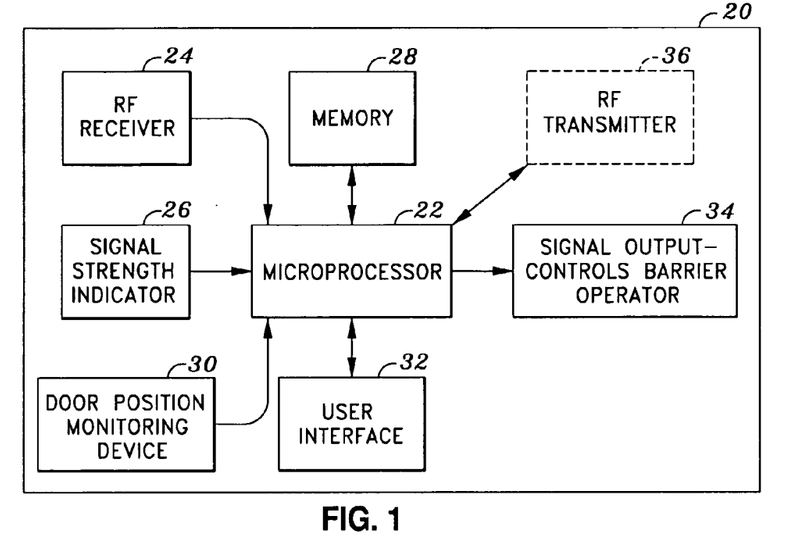
FIG. 1 is a general schematic diagram of one embodiment of the receiver (or transceiver) unit in the proximity barrier control system, provided in accordance with the principles of the invention.

FIG. 1 is a schematic diagram of one embodiment of the receiver unit (or stationary transceiver) of the proximity barrier control system provided in accordance with the principles of the invention. The receiver unit (or stationary transceiver) 20 is provided with a microprocessor 22 which may comprise several different input and output ports to communicate with different modules within the receiver unit. Radio frequency receiver 24 provides the received signals to the microprocessor 22 for signal processing. In one embodiment, the receiver will operate based on spread spectrum technology. Such received signal may include the transmitter identity code, the directional information regarding where the authorized transmitter is heading etc. Signal strength indicator 26 may be used to provide additional information regarding the strength of the received signal. With this indicator 26, the microprocessor 22 can determine not only whether the authorized transmitter is within the predetermined range, but also how close the transmitter is from the receiver, or receivers in the case of a multiple-receiver embodiment. Memory 28 may be used to store the identity code of the authorized transmitter, where each authorized transmitter has its own identity code. Memory 28 may also be used to store the received signal information during programming mode, which stores the signal strength and the directional information of an authorized transmitter as it is approaching or leaving the receiver.

The stored signal information can be used during the operation mode to verify whether the object (having the transmitter) is approaching or leaving the receiver along the predetermined path. A barrier position monitoring device 30 may be used to continuously monitor the position of the barrier. Examples of such garage door monitoring devices are disclosed in U.S. Pat. No. 6,597,291. Upon receiving information regarding the position of the barrier, the microprocessor 22 may determine whether it is necessary to open or close such a barrier when other conditions are met. User interface 32 such as an LED or a LCD display and buttons or keys as input devices are also necessary to input and display the current status of the unit. When the proper signal is received and other conditions are met, the microprocessor 22 will activate the barrier operator (not shown) through a signal output device 34, such as a relay.

In one embodiment, the receiving unit 20 is a stationary transceiver 20 equipped with an optional RF transmitter 36. As mentioned above, the barrier operator will be activated by microprocessor 22 when the proper signal is received and other conditions met. However, either prior to or simultaneous with the activation of the barrier, the stationary transceiver 20 may transmit a notification signal using optional RF transmitter 36. This notification signal may be received by the mobile transceiver and used to notify a user that the barrier is about to be closed. In the case of a garage door and a vehicle equipped with a mobile transceiver, the notification signal will inform the driver that the garage door will close even though the driver may be unable to see it. It should be appreciated that the notification signal may manifest as one or both of an audible indicator (e.g., one or more beeps) and a visual indicator (e.g., flashing LED).

Figure 2:
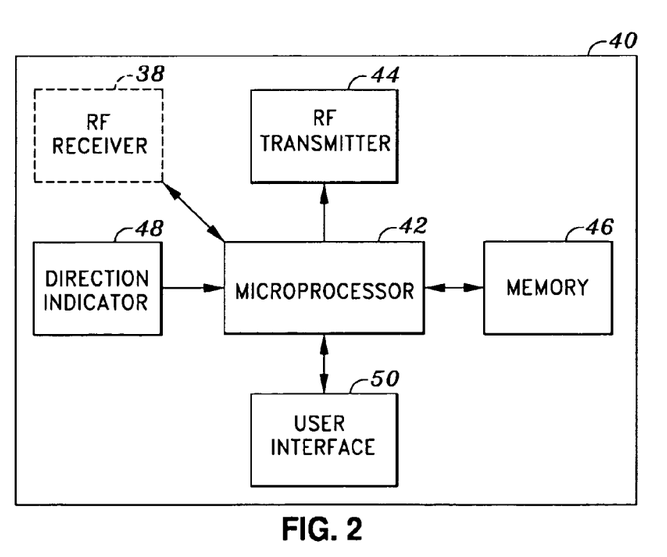
FIG. 2 is a general schematic diagram of one embodiment of the transmitter (or transceiver) unit in the proximity barrier control system, provided in accordance with the principles of the invention.

FIG. 2 is a schematic diagram of one embodiment of the transmitting device (or mobile transceiver) 40. The transmitting device (or mobile transceiver) 40 comprises a microprocessor 42 which connects and communicates with different modules. Radio frequency transmitter 44 continuously transmits a signal when the transmitting device is powered up. In one embodiment, the transmitter operates based on spread spectrum technology to provide reliable communication. Alternatively, or in addition to, the transmitter may operate based on Bluetooth technology. A memory device 46 is used to store the transmitter identity code. Each transmitting device has its own identity code that may be programmed at the factory. A portion of the transmitted signal consists of the direction where the transmitter is heading. This directional information is determined by directional indicator 48. User interface 50 such as LED or LCD display and buttons or keys as input devices are also necessary to input and display the current status of the unit.

In one embodiment, the transmitting device 40 is a mobile transceiver 40 equipped with optional RF receiver 38. This RF receiver may be used to receive the notification signal indicating that the barrier is about to close. As mentioned above, microprocessor 22 may activate the barrier operator when the proper signal is received from a mobile transceiver 40 and other conditions met. It may be desired to have a notification signal sent by RF transmitter 36 so that a user is informed of the impending closure of the barrier even though the mobile transceiver 40 may be out of sight. In such an embodiment, the optional RF receiver 38 would be used to receive this notification signal. In anther embodiment, upon receiving the notification signal microprocessor 42 may provide an audible and/or visual indicator to the user via the user interface 50. In yet another embodiment, the user may be given the option of halting the barrier activation.

Figure 3:
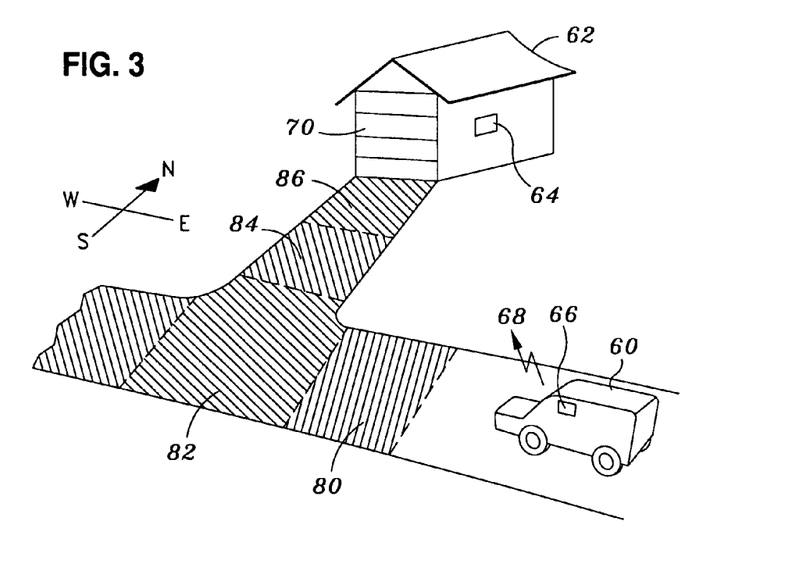
FIG. 3 is a diagram that illustrates the operation of one embodiment of the proximity barrier control system.

FIG. 3 illustrates one embodiment of the operation of the proximity barrier control system. In this figure, a proximity barrier control system has been installed to operate a garage door 70. In this embodiment, a receiving (or stationary transceiver) unit 20 has been coupled to operate the garage door 70, and is shown as receiver (or stationary transceiver) unit 64. In addition a transmitting (or mobile transceiver) unit 40 has been attached to a vehicle 60, and is shown as transmitter (or mobile transceiver) unit 66. Moreover, in the embodiment of FIG. 3 vehicle 60 is traveling towards garage 62. Transmitter (or mobile transceiver) unit 66 is attached to vehicle 60 and continuously transmits control signal 68. This transmitter unit 66 (or mobile transceiver) has been programmed to the receiver (or stationary transceiver) unit 64, and therefore will recognize and process the transmitted signal (e.g., control signal 68) when it is in the reception range of the receiver (or stationary transceiver) unit 64. While not shown in FIG. 3, it should equally be appreciated that the depicted proximity barrier control system may further include multiple receiving units (or stationary transceivers) which detect and communicate with transmitter (or mobile transceiver) unit 66. In one embodiment, such additional receiving units (or stationary transceivers) may be slaves which receive signals from the transmitter unit 66 to check signal strength. In addition, slave receivers may communicate with the main receiver (or stationary transceiver) unit 64 either wirelessly or by hardwire. In this fashion, the main receiver (or stationary transceiver) unit 64 can use additional slaves to monitor the changes in signal strength of the transmitting (or mobile transceiver) unit 66 to determine if the garage door 70 should be opened or closed.

Continuing to refer to FIG. 3, as the vehicle travels towards garage 62, it will first enter the reception region 80. In the embodiment of FIG. 3, there are 4 reception regions having different signal strength levels, with region 80 having the lowest signal strength. In this embodiment, the signal strengths of regions 82, 84 and 86 increase as one approaches the garage. As will be understood by one skilled in the art, a fewer or greater number of regions may similarly be specified.

Figure 4A:
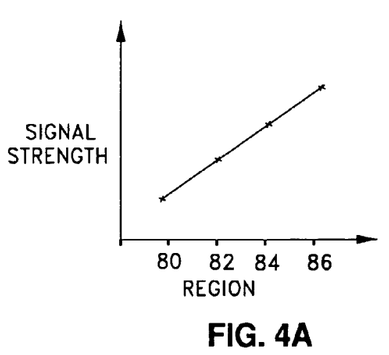
FIG. 4a is a diagram of one embodiment of the relationship between different regions and the respective signal strength of a specific path.
Figure 4B:
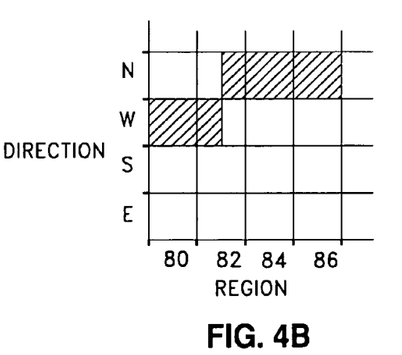
FIG. 4b is a diagram of one embodiment of the relationship between different regions and the respective directions of a specific path.

Once vehicle 60 is within one of the specified reception regions (e.g., 80, 82, 84 and 86), the receiver (or stationary transceiver) 64 will be able to receive a control signal from the transmitter (or mobile transceiver) 66. In one embodiment, this control signal includes related information, such as transmitter identification information, the signal strength and directional information. In this case, when the vehicle 60 is within reception region 80, the signal strength will be at its lowest level and the direction will be towards the West. As the vehicle continues to move towards the garage, it will enter region 82 where the signal strength will be higher than region 80, yet the directional information will remain the same as the region 80 (e.g., heading West). Once the vehicle 60 makes a right turn onto the driveway, the vehicle 60 will be heading north and the signal strength will again increase due to the fact that the vehicle 60 is now in region 84. At this point, the transmitter (or mobile transceiver) unit 66 will be transmitting a control signal 68 which indicates that both the directional information (i.e., vehicle 60 is heading North in the direction of the garage 62), and signal strength information (i.e., the vehicle 60 is on the driveway). As the vehicle continues up the driveway towards the garage 62, the signal strength will continue to increase. Based on the configuration of the illustrated garage and driveway, graphs may be plotted as shown in FIG. 4a and FIG. 4b. FIG. 4a shows that the signal strength increases from region 80 to region 86. FIG. 4b shows the direction of the vehicle as a function of the various reception regions.

In one embodiment, the invention allows users to program specific paths that will activate the proximity barrier control system under specific circumstances. If the authorized vehicle is traveling on a programmed path, the proximity barrier control system will either: (i) open the barrier if the authorized vehicle is approaching and in proximity of the barrier, or (ii) close the barrier if the authorized vehicle is leaving and has cleared the immediate area of the barrier.

In order to program user-specific paths, the microprocessor 22 of the receiver (or stationary transceiver) unit 20 may store the signal strength and directional information of the desired path into its memory 28 when the receiver unit is in the programming mode. During normal operation, if the signal strength and directional information of an object (such as an authorized vehicle) meets the stored criteria, the proximity barrier control may be activated to control the barrier in the desired manner. Similarly, in the case of a multiple-receiver/transceiver system, each of the slave units may transmit detected signal strength and directional information to the main receiving (or stationary transceiver) unit 20 so that a determination can be made by the main receiving (or stationary transceiver) unit 20 on whether the detected signal strength and directional information meets the stored criteria.

Figure 5:
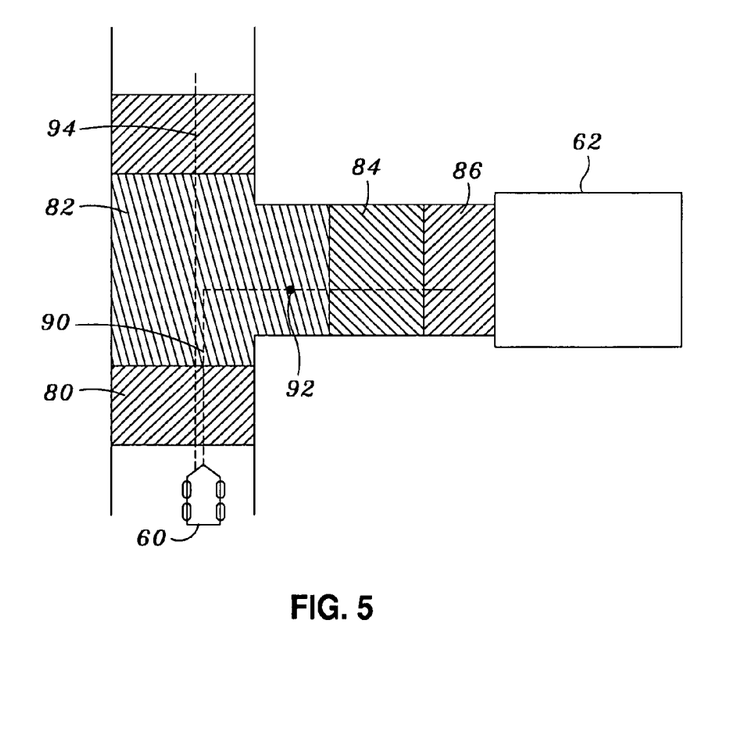
FIG. 5 is a top view of a diagram illustrating one embodiment of the door open operation of the invention.

FIG. 5 illustrates a top view of the garage and driveway configuration as shown in FIG. 3. The figure illustrates one embodiment of a door-open operation in accordance with the principles of the invention. In this embodiment, the user has already programmed one of the specific approaching paths as path 90, with location 92 being the point where the proximity barrier control system will be activated to open the garage door. In one embodiment, the vehicle 60 must travel along the predetermined path in order to meet the signal strength and directional requirements, meaning that the vehicle must turn onto the driveway for the garage door to be opened. If the vehicle 60 does not turn onto the driveway, the transmitter (or mobile transceiver) unit 66 will not provide the proper control signal 68 to the receiver (or stationary transceiver) unit 64 (or multiple receiving units), and the garage door 70 will not be actuated. For example, if a user travels along path 94 but decides not to go home and instead drives right by the driveway, the garage door 70 will not be actuated. Without directional verification, the garage door would have opened because the signal strength in region 82 is identical to that at location 92. Thus, in this embodiment even if the signal strength requirement is fulfilled, the garage door will open only if the directional condition is also met. Therefore, the advantage of having both signal strength and direction as verification conditions avoids the undesired situation of accidentally triggering the proximity barrier control system.

Figure 6:
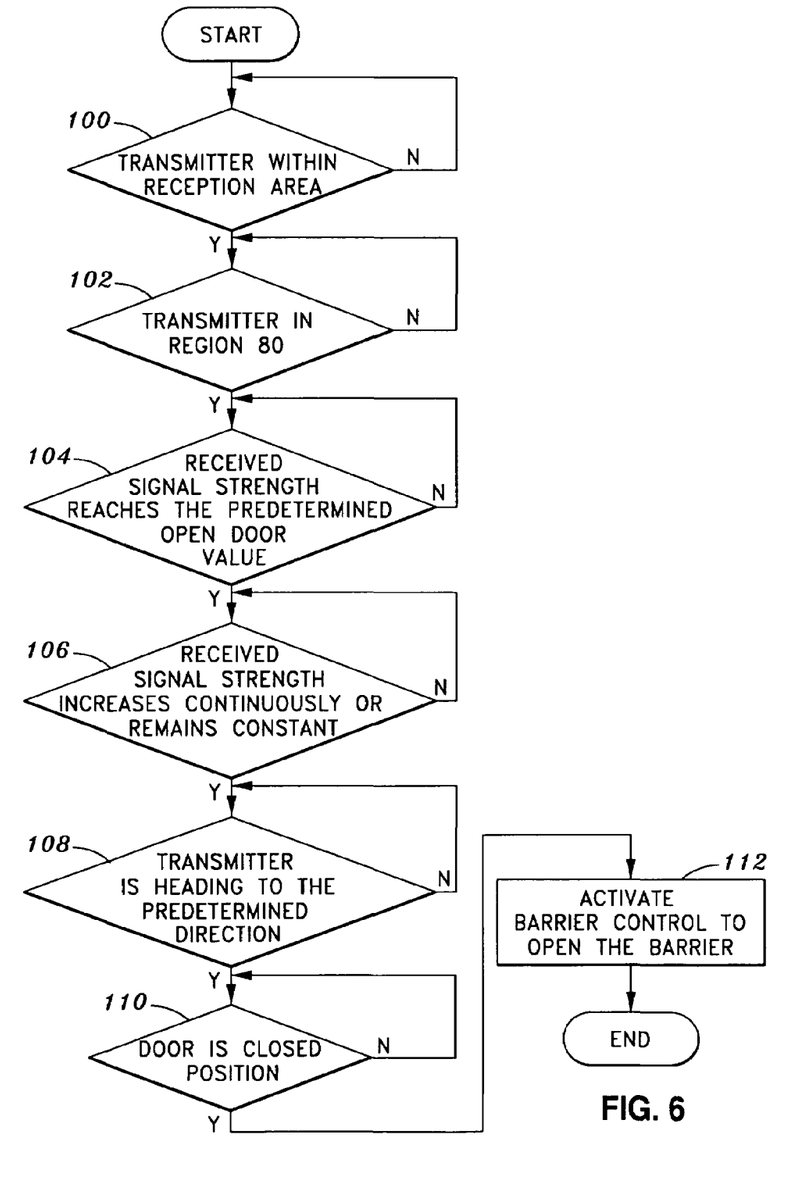
FIG. 6 is a flow chart illustrating one embodiment of the control flow of a door open sequence.

FIG. 6 is a flow chart illustrating one embodiment of the requirements for a door open sequence. At decision block 100 a determination is made as to whether an authorized transmitter (or mobile transceiver) (e.g., vehicle 60 with the transmitter unit 66) is within the signal reception range. If the authorized transmitter (or mobile transceiver) unit is within the signal reception range, the process continues to block 102 where a determination is made as to whether the authorized transmitter (or mobile transceiver) has just entered the signal reception range, such as region 80, or other regions. In one embodiment, in order to activate the door open sequence, the vehicle must enter the reception range from the lowest signal region, which is region 80. As the authorized transmitter (or mobile transceiver) travels towards the garage, the signal strength reaches the predetermined value as indicated as block 104, such as the signal strength at location 92. The barrier control will be activated with an additional condition specified as block 106 i.e., that the signal strength has not decreased throughout this process. The signal strength must be monitored closely to determine if the vehicle is really approaching the garage. If the signal strength decreases at one point, it may indicate that the driver of the vehicle intends to leave the reception area. The door open sequence will not proceed unless the signal strength is constantly increasing or remains constant. Block 108 determines whether the transmitter (or mobile transceiver) is heading towards the right direction. If so, the barrier control will be activated. The door will then be opened if the previous door position is closed, as shown as block 110.

Figure 7:
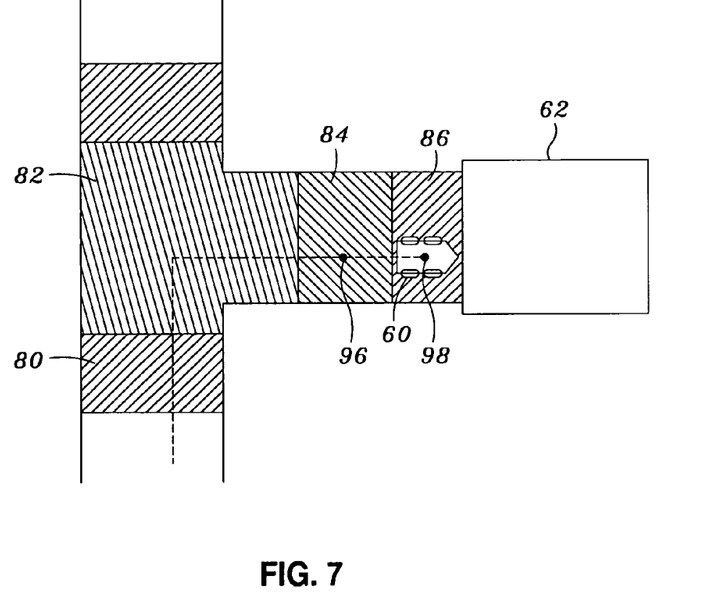
FIG. 7 is a top view diagram describing one embodiment of the door close operation of the invention.

FIG. 7 illustrates one embodiment of the door close sequence provide in accordance with the principles of the invention. In the figure, a garage and driveway configuration is shown with a vehicle leaving the garage. Location 96 is where the user has programmed the garage door to be closed. Therefore, the vehicle must be at a location that is closer to the garage than location 96 for activation to occur. Assuming the vehicle is originally parked at location 98, and it is now leaving the garage. The signal strength of the signal received by the receiver (or stationary transceiver) unit will decrease as the vehicle departs from the garage. When the vehicle reaches location 96 where the signal strength decreases to the predetermined value, and the direction of the vehicle remains the same as the predetermined direction, the door will be activated. Thus, the door will close if the previous door position is open.

Figure 8:
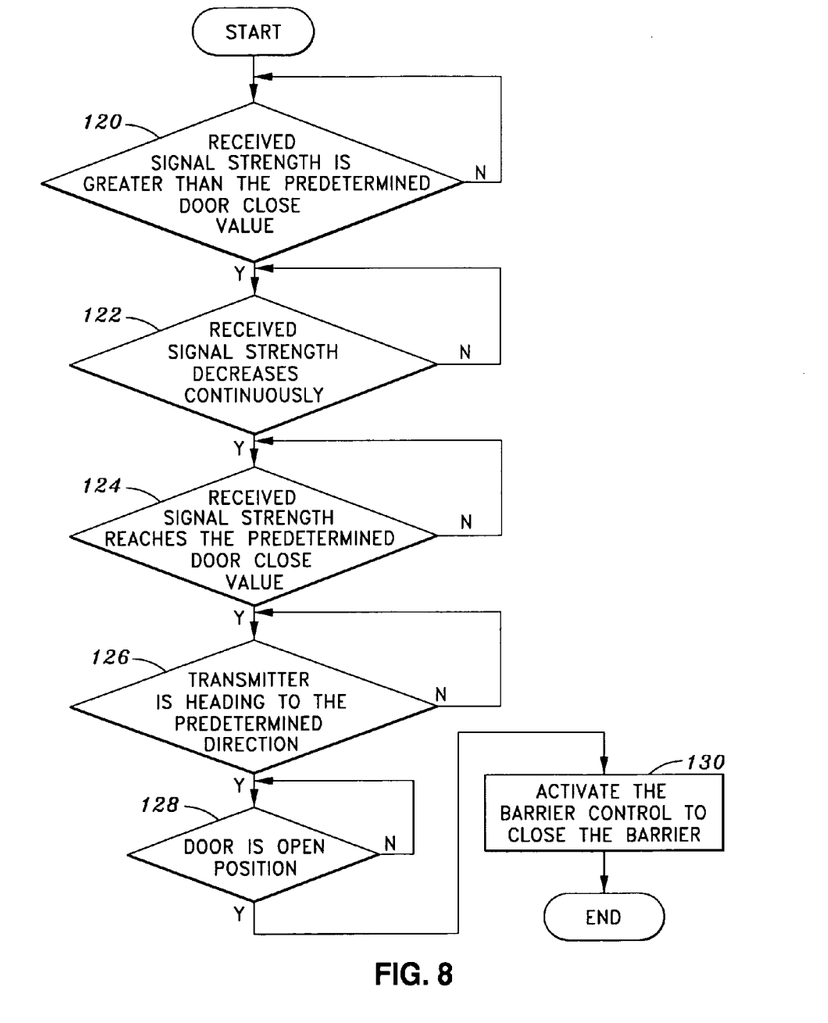
FIG. 8 is a flow chart illustrating one embodiment of the control flow of a door close sequence.

FIG. 8. is a flow chart illustrating one embodiment of the control flow of a door close sequence provides in accordance with the principles of the invention. Since the vehicle must leave the garage from a close proximity in order to activate the door close sequence, block 120 may be used to determine whether the vehicle 60 is in the close proximity of the garage. The vehicle must be closer to the garage than the predetermined door close value, so when it leaves the garage, the signal strength will decrease continuously until it reaches the predetermined door close signal strength as specified in blocks 122 and 124. At block 126, the direction of the vehicle is verified. If the vehicle is heading in the desired direction, the door will be activated by the barrier control. Thus, if the previous door position was open, the door will now close.

Besides controlling a barrier, the invention can also be used to control lighting, so when an authorized vehicle or person arrives home, lights can be turned on automatically. The same principle applies to wireless security which ensures that one has armed the system when one leaves one's property, or controlling the thermostat to automatically lower the preset temperature of the furnace in the winter to save energy. Therefore, the invention can be applied to control different electronic devices.

Figure 9:
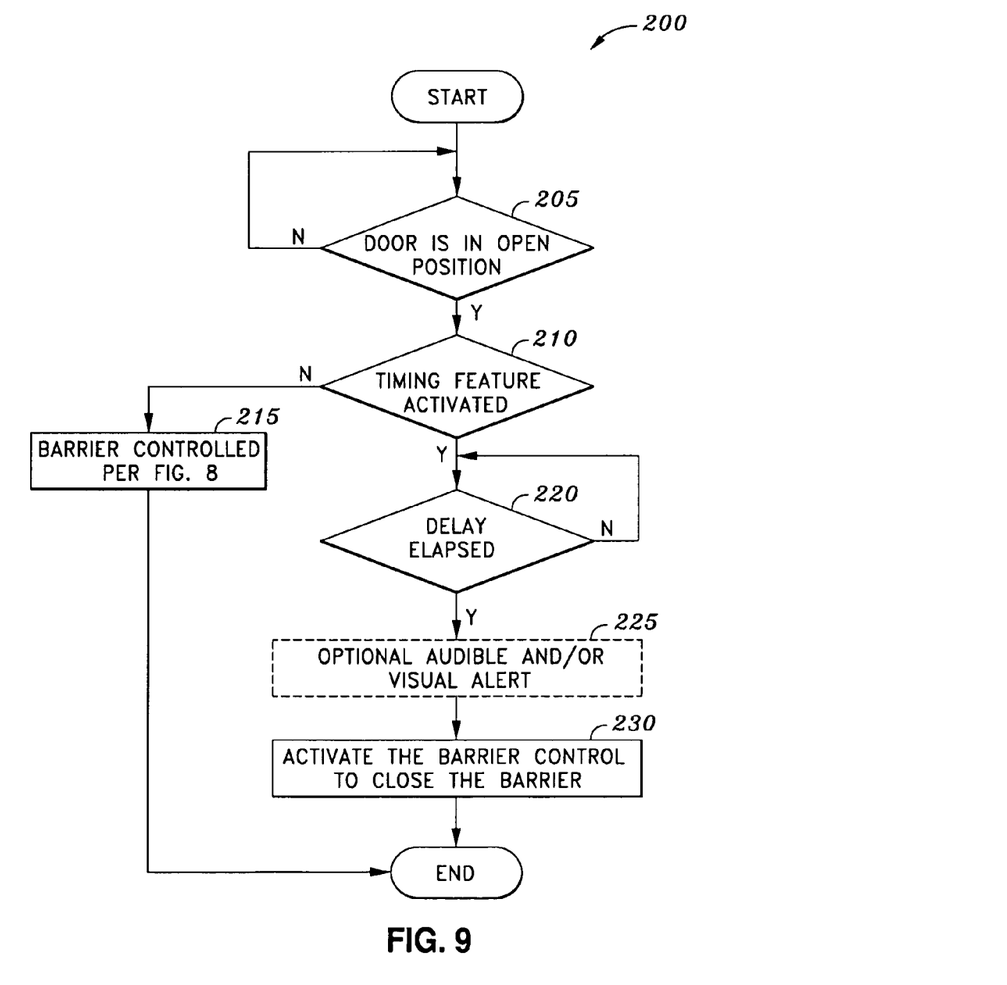
FIG. 9 is a flow chart illustrating one embodiment of a timing feature used in conjunction with the door close sequence of FIG. 8.

Referring now to FIG. 9, depicted is a flow chart illustrating one embodiment of a timing feature which may be incorporated into the closing sequence of FIG. 8. In particular, process 200 begins at block 205 where it is determined whether or not the barrier is in the open position. If so, process 200 will continue to block 210 where a second determination may be made as to whether the timing feature has been activated. In one embodiment, the timing feature of process 200 may be activated remotely by transmitting (or mobile transceiver) unit 66, or may be activated locally using receiver (or stationary transceiver) unit 64. If it is determined at block 210 that the timing feature has not been activated, then the barrier may be controlled in the same fashion described above with reference to FIG. 8 (block 215). However, if it is determined at block 210 that the time feature has been activated, then process 200 may continue to block 220.

Block 220 of process 200 involves a determination of whether a predetermined delay period has lapsed since the barrier was opened. In one embodiment, part of the timer activation involves the user selection of a delay period, which in one embodiment represents the length of time since the barrier is detected in the open position. While in one embodiment, this delay period ranges from 5 seconds to 60 seconds, it should equally be appreciated that it may be longer or shorter in duration.

In another embodiment, or in addition to one or more of the previous embodiment, an optional audible signal (e.g., voice announcement, alarm, etc.) or visual alert may be used to alert someone that the barrier is about to close (block 225). It should further be appreciated that the alert may be emitted simultaneously with the barrier closing or some amount of time prior to closing the barrier. In this fashion, the safety of the barrier control mechanism may be improved by giving the user advance notice of the barrier's closing.

Regardless of whether the optional alert is provided, once the delay has lapsed process 200 may then continue to block 225 where the barrier control mechanism may be activated and the barrier closed in the same manner previously described.

In another embodiment, the timing feature of FIG. 9 also may be used independent of the closing sequence described in FIG. 8. For example, the timing feature described below with reference to FIG. 10 may be used in conjunction with the opening sequence described in FIG. 6. Additionally, such a timing feature may be used independent of either the opening sequence of FIG. 6 or the closing sequence of FIG. 8, but rather just function as a standalone sequence. As a standalone function, the below described timing feature may be used to ensure that a barrier (e.g., garage door) is never left open over night or for extended periods of time.

Figure 10:
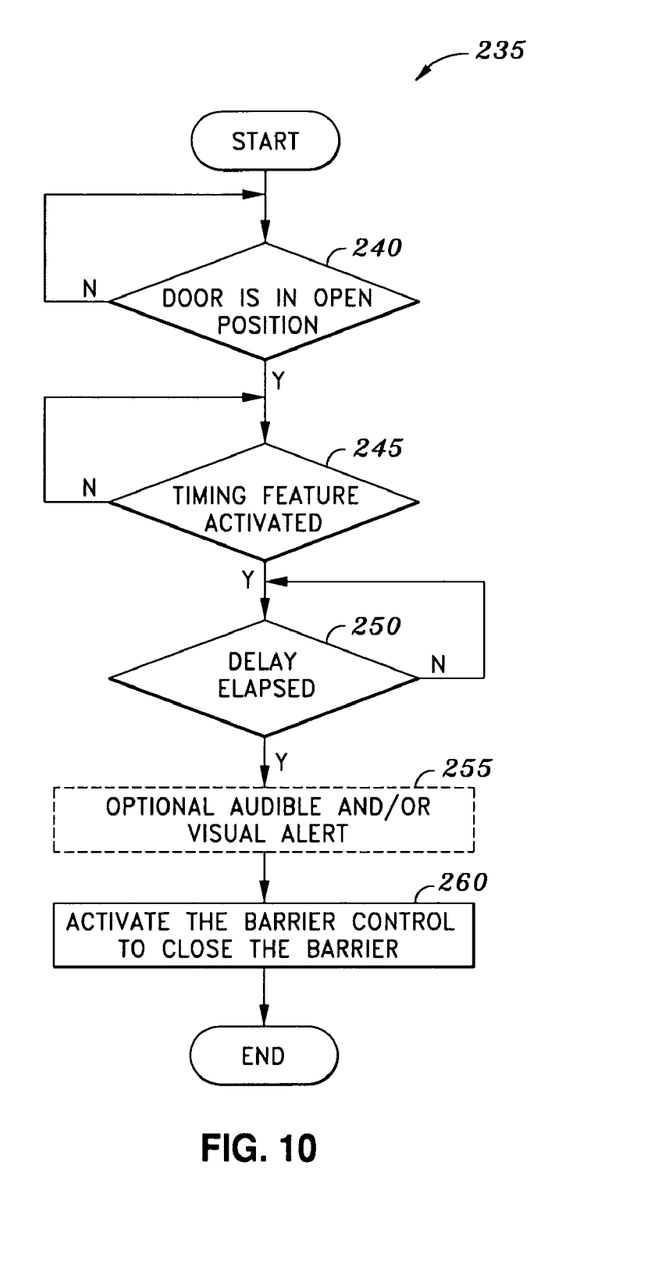
FIG. 10 is a flow chart illustrating one embodiment of a standalone timing feature.

Process 235 of FIG. 10 begins with the same determination as in FIG. 9 as to whether or not the barrier is in the open position (block 240). If so, process 235 may continue to block 245 where a second determination may be made as to whether the timing feature has been activated. If so, then process 235 may continue to block 250 where a check is made as to whether the predetermined delay period has lapsed since the barrier was opened. Once the predetermined delay period lapses, process 235 may then continue to optional block 255 where an optional audible signal (e.g., voice announcement, alarm, etc.) or visual alert may be used to alert someone that the barrier is about to close. As previously mentioned, it should further be appreciated that the alert may be emitted simultaneously with the barrier closing or some amount of time prior to closing the barrier. In this fashion, the safety of the barrier control mechanism may be improved by giving the user advance notice of the barrier's closing.

Whether or not an optional alert is provided, process 235 ends with the activation of a barrier control mechanism to close the barrier. In this fashion, a user can ensure that a barrier, such as a garage door, is not left open inadvertently.

In one embodiment, part of the timer activation involves the user selection of a delay period, which in one embodiment represents the length of time since the barrier is detected in the open position. While in one embodiment, this delay period ranges from 5 seconds to 60 seconds, it should equally be appreciated that it may be longer or shorter in duration.

One aspect of the invention is to combine the proximity barrier control features discussed above with the timer feature also discussed above. In one embodiment, the aforementioned proximity barrier control system is equipped with three operational modes (e.g., Mode 1, Mode 2 and Mode 3). Mode 1 may be characterized by an automatic opening sequence only. Namely, when a mobile object approaches the barrier, an opening sequence will be initiated, which in one embodiment may be the opening sequence described above with reference to FIG. 6.

Mode 2 may be characterized by an automatic opening and an automatic closing sequence. Thus, in Mode 2 the proximity and/or direction of motion of a mobile object may be used to automatically open a barrier and automatically close the barrier. In one embodiment, Mode 2 is characterized by the opening sequence of FIG. 6 in combination with the closing sequence of FIG. 8.

Finally, Mode 3 may be essentially the same as Mode 2, with the addition of the timing feature discussed above with reference to FIGS. 9 and 10. For example, when in Mode 3 the proximity barrier control system of above may automatically open and close based on the proximity and/or direction of motion of a mobile object. Before initiating the closing sequence, however, the timing feature described above in FIG. 8 may be initiated.

It should further be appreciated that, even when the timing feature of FIGS. 9 and 10 has been activated, the proximity barrier control system may be equipped with a timer reset to enable a user to terminate the timer so that the barrier will not close. This may be desirable, for example, when an individual is working in the garage and desires the garage door to stay open for an extended period of time.

Figure 11:
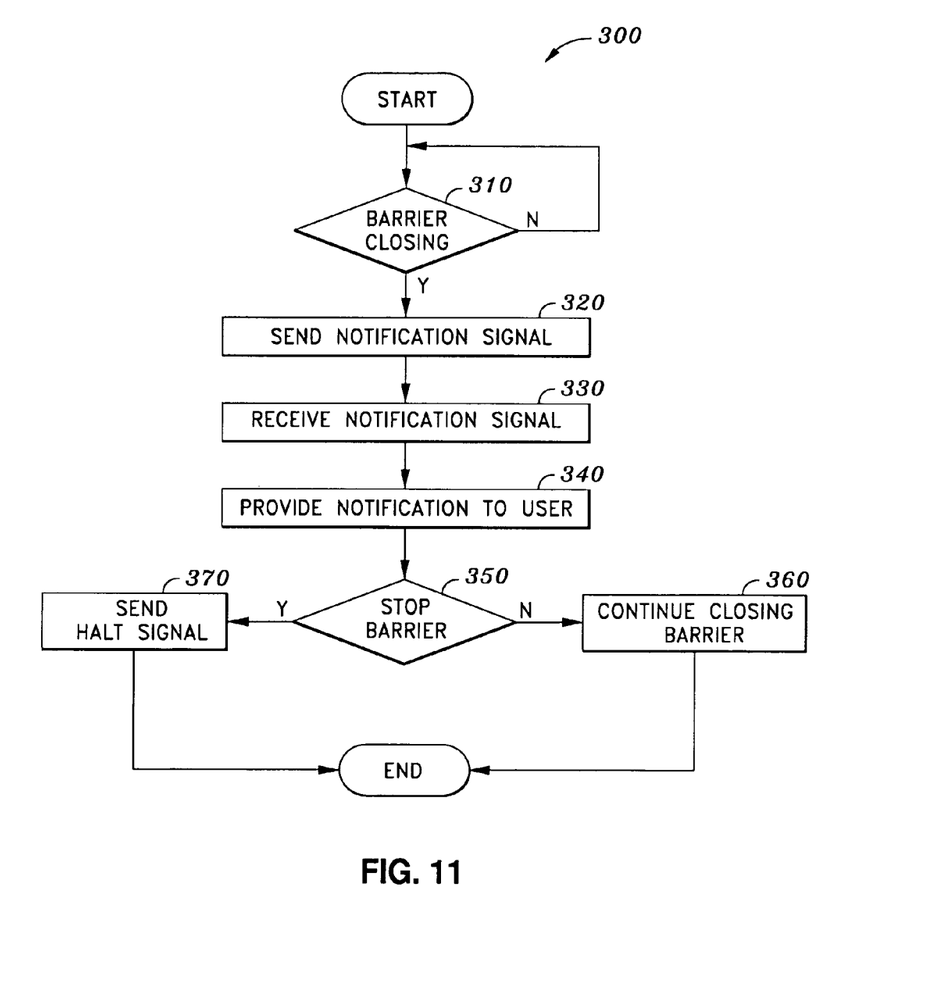
FIG. 11 is a flow chart illustrating one embodiment of how a notification signal may be provided to a user in accordance with the principles of the invention.

Referring now to FIG. 11, depicted is a flow chart illustrating one embodiment of how a barrier control system consistent with the present invention may provide a notification signal when the barrier is about to close. Process 300 begins at block 310 with a determination as to whether the barrier is about to close. In one embodiment, this determination is based on the door close sequence of FIG. 8. In another embodiment, the determination is based on any set of events, whether manually initiated or not, which causes the barrier to close.

Once it is determined that the barrier is in fact about to close, at block 320 a stationary transceiver (e.g., stationary transceiver 64) may transmit a notification signal using, for example, an RF transmitter (e.g., RF transmitter 36). In turn, at block 330, a mobile transceiver (e.g., mobile transceiver 66) may receive and process the notification signal. Notification of the closing barrier may then be provided to a user at block 340 in the form of an audible sound and/or a visual indicator (e.g., flashing light, etc.). At this point, the user may be provided with the opportunity to stop the closing of the barrier (block 350). If the user takes no action in response to the notification signal, process 300 will continue to block 360 where the barrier will continue to close. If, on the other hand, the user desires to stop the barrier from closing, the user may send a halt signal back to the stationary transceiver at block 370. In one embodiment, the halt signal will return the barrier to the open position. If, on the other hand, the notification signal is sent prior to the barrier is activated, then the halt signal will interrupt the activation signal and cause the barrier not to begin closing.

While FIG. 11 is described in terms of providing a notification signal to a mobile transceiver when a barrier is about to close, it should equally be appreciated that the notification signal may similarly be provided when the barrier is about to open. In another embodiment, the notification signal is actually a barrier position signal, and the stationary transceiver is able to indicate to the mobile transceiver what the current barrier position is (e.g., opened or closed).

The invention may also be implemented in before-market and after-market applications. In before-market applications, the transmitting (or mobile transceiver) unit can be built-into the vehicles to provide power and the directional information to the user. For example, the unit may built into the overhead console or inside a rear view mirror. The receiving (or stationary transceiver) unit can also be built-into a desired device, such as a garage door opener or gate opener.

After-market applications for using the barrier control may also be implemented. In one embodiment, this would require simple installation by the user in mounting the transmitting (or mobile transceiver) unit to the vehicle and the receiving (or stationary transceiver) unit inside the garage. For example, the transmitting (or mobile transceiver) unit may be powered using a vehicle's cigarette lighter.

While the preceding description has been directed to particular embodiments, it is understood that those skilled in the art may conceive modifications and/or variations to the specific embodiments described herein. Any such modifications or variations which fall within the purview of this description are intended to be included herein as well. It is understood that the description herein is intended to be illustrative only and is not intended to limit the scope of the invention.

What is claimed is:

1. A system comprising:
   a mobile transceiver to transmit a control signal having a signal strength, wherein said control signal includes identification information and including; and,
   a stationary transceiver in communication with a barrier control device, said stationary transceiver to,
      store user-defined signal strength information,
      receive said control signal from said mobile transceiver,
      compare the signal strength of said control signal to said user-defined signal strength information, and if there is a match, actuate the barrier control device, and
      transmit a notification signal to said mobile transceiver indicating that said barrier control device is to be actuated.

2. The system of claim 1 further comprising an indicator coupled to said mobile transceiver, said indicator to indicate to a user that said barrier control device is being actuated.

3. The system of claim 1, wherein, after receiving said notification signal and in response to a user action, said mobile transceiver is further to provide a halt signal to said stationary transceiver to stop said barrier control device from being actuated.

4. The system of claim 1, wherein said stationary transceiver transmits the notification signal prior to actuating said barrier control device.

5. The system of claim 1 wherein said stationary transceiver is further to store a predetermined delay for actuating said barrier control device, and wherein said actuation signal is provided once said predetermined delay has lapsed.

6. The system of claim 5 wherein even if said stationary transceiver does not receive said control signal, said stationary transceiver is further to cause said barrier control device to close said barrier after said predetermined delay has lapsed.

7. The system of claim 6, further comprising a timer reset which, when activated, suspends the actuation of said barrier control device even after said predetermined delay has lapsed.

8. The system of claim 5 wherein said stationary transceiver is further to provide an alert to indicate that said predetermined delay is about to lapse.

9. The system of claim 5 wherein said stationary transceiver has at least a first operational mode and a second operational mode, and wherein during said first operational mode said barrier control device may be actuated to close said barrier without regard to whether said predetermined delay has lapsed, and wherein during said second operation mode said barrier control device may be actuated to close said barrier only after said predetermined delay has lapsed.

10. The system of claim 1 wherein said control signal further includes directional information and said stationary transceiver is further to,
    store user-defined directional information,
    compare both the directional information and the signal strength of said control signal to said user-defined directional information and user-defined signal strength information, and if there is a match, actuate the barrier control device, and
    transmit a notification signal to said mobile transceiver indicating that said barrier control device is being actuated.

11. The system of claim 10 wherein said user-defined directional information and user-defined signal strength information is programmable into a memory of said stationary transceiver during a program mode.

12. The system of claim 10 wherein said user-defined directional information includes a plurality of direction values corresponding to directions of movement for said mobile transceiver, and said user-defined signal strength information includes a plurality of signal strength values corresponding to positions of said mobile transceiver for each of a plurality of reception regions.

13. The system of claim 12 wherein said plurality of signal strength values are defined by signal strengths of said control signal for each of said plurality of reception regions, said signal strength to be detectable by a signal strength indicator of said stationary transceiver.

14. The system of claim 1 wherein said control signal is one of a radio frequency signal and a spread spectrum signal.

15. The system of claim 1 wherein said identification information includes a mobile transceiver ID code, and said stationary transceiver is further to compare said mobile transceiver ID code in said control signal to a pre-programmed mobile transceiver ID code in a memory of said stationary transceiver.

16. The system of claim 1, wherein said mobile object is a vehicle and said barrier control device is a garage door opener, and wherein said mobile transceiver transmits said control signal on a continuous basis and said mobile transceiver is coupled said vehicle.

17. The system of claim 1 further comprising a barrier position monitor to detect a barrier position of said barrier, and wherein said stationary transceiver actuates said barrier control device based on said comparison of said signal strength to said user-defined signal strength information, as well as on said barrier position.

18. The system of claim 1 further comprising a plurality of stationary transceivers, wherein each of said plurality of stationary transceiver are to,
receive said control signal from said mobile transceiver,
provide said control signal to said stationary transceiver so that said stationary transceiver can compare the signal strength of said control signal to said user-defined signal strength information, and if there is a match, actuate the barrier control device, and
transmit a notification signal to said mobile transceiver indicating that said barrier is being actuated.

19. The system of claim 18, wherein said plurality of stationary transceivers are slave units, and wherein said stationary transceiver uses signal strength information provided by said plurality of stationary transceivers to determine if said barrier control device should be actuated.

20. The system of claim 1, wherein said stationary transceiver communicates with said barrier control device using one of a hardwired connection and a wireless connection.

21. A method comprising:
storing user-defined signal strength information in a memory of a stationary transceiver, said stationary transceiver to be in communication with a barrier control device, said barrier control device to control a position of a barrier;
transmitting a control signal by a mobile transceiver, said control signal including identification information and having a signal strength;
receiving said control signal by the stationary transceiver;
comparing, by said stationary transceiver, the signal strength of said control signal to said user-defined signal strength information, and, if there is a match, actuating the barrier control device; and
transmitting a notification signal to said mobile transceiver indicating that said barrier control device is being actuated.

22. The method of claim 21 further comprising indicating to a user that said barrier control device is being actuated.

23. The method of claim 21 further comprising, after said transmitting the notification signal, providing a halt signal in response to a user action, said halt signal to cause said stationary transceiver to stop said barrier control device from being actuated.

24. The method of claim 21, wherein said transmitting the notification signal is done prior to said actuating the barrier control device.

25. The method of claim 21 further comprising storing a predetermined delay period in the memory of said stationary transceiver, and wherein said actuating occurs once said predetermined delay has lapsed.

26. The method of claim 25 further comprising, if said stationary transceiver does not receive said control signal, actuating the barrier control device to close said barrier after said predetermined delay has lapsed.

27. The method of claim 26 further comprising activating a timer reset to suspend the actuation of said barrier control device even after said predetermined delay has lapsed.

28. The method of claim 25 further comprising providing an alert to indicate that said predetermined delay is about to lapse.

29. The method of claim 25 further comprising:
actuating said barrier control device to close said barrier without regard to whether said predetermined delay during a first operation mode; and
actuating said barrier control device to close said barrier only after said predetermined delay during a second operation mode.

30. The method of claim 21 further comprising:
storing user-defined directional information in said memory;
transmitting the control signal where said control signal has a signal strength and includes said identification information and directional information;
comparing, by said stationary transceiver, both the signal strength and the directional information in said control signal to said user-defined signal strength information and said user-defined directional information, and, if there is a match, actuating the barrier control device; and
transmitting a notification signal to said mobile transceiver indicating that said barrier control device is being actuated.

31. The method of claim 30 wherein said comparing comprises comparing, by said stationary transceiver, the directional information and signal strength in said control signal to said user-defined directional information and user-defined signal strength information, where said user-defined directional information includes a plurality of direction values corresponding to directions of movement for said mobile transceiver, and said user-defined signal strength information includes a plurality of signal strength values corresponding to positions of said mobile transceiver for each of a plurality of reception regions.

32. The method of claim 31 wherein said plurality of signal strength values are defined by signal strengths of said control signal for each of said plurality of reception regions, said signal strength to be detectable by a signal strength indicator of said stationary transceiver.

33. The method of claim 21 wherein transmitting said control signal by the mobile transceiver comprises transmitting one of a radio frequency control signal and a spread spectrum control signal.

34. The method of claim 21 wherein transmitting said control signal by the mobile transceiver, comprises transmitting said control signal where said identification information is a mobile transceiver ID code, and the method further comprises comparing said mobile transceiver ID code in said control signal to a pre-programmed mobile transceiver ID code in a memory of said stationary transceiver.

35. The method of claim 21 further comprising transmitting said control signal by said mobile transceiver on a continuous basis where said mobile transceiver is coupled to a mobile object, and wherein said is a vehicle and said barrier control device is a garage door opener.

36. The method of claim 21 further comprising:
monitoring a barrier position of said barrier;
comparing said signal strength of said control signal to said user-defined signal strength information; and actuating said barrier control device based on said comparing and on said barrier position.

37. The method of claim 21 further comprising:
receiving said control signal by a plurality of stationary transceivers;
providing said control signal to said stationary transceiver so that said stationary transceiver can compare the signal strength of said control signal to said user-defined signal strength information, and, if there is a match, actuating the barrier control device; and
transmitting a notification signal to said mobile transceiver indicating that said barrier control device is being actuated.

38. The method of claim 37, wherein said plurality of stationary transceivers are slave units, the method further comprising using, by said stationary transceiver, signal strength information provided by said plurality of stationary transceivers to determine if said barrier control device should be actuated.

39. The method of claim 21, wherein said stationary transceiver is in communication with said barrier control device using one of a hardwired connection and a wireless connection.

40. A system comprising:
a mobile transceiver to transmit a control signal including position information and identification information; and,
a stationary transceiver in communication with a barrier control device, said stationary transceiver to,
store user-defined position information,
receive said control signal from said mobile transceiver,
compare said position information to said user-defined position information, and if there is a match, actuate the barrier control device, and
transmit a notification signal to said mobile transceiver indicating that said barrier control device is to be actuated.

41. The system of claim 40, wherein, after receiving said notification signal and in response to a user action, said mobile transceiver is further to provide a halt signal to said stationary transceiver to stop said barrier control device from being actuated.

42. The system of claim 40, wherein said stationary transceiver is further to store a predetermined delay for actuating said barrier control device, and wherein said actuation signal is provided once said predetermined delay has lapsed.

43. The system of claim 42 wherein even if said stationary transceiver does not receive said control signal, said stationary transceiver is further to cause said barrier control device to close said barrier after said predetermined delay has lapsed.

44. The system of claim 42 wherein said stationary transceiver is further to provide an alert to indicate that said predetermined delay is about to lapse.

45. The system of claim 42 wherein said stationary transceiver has at least a first operational mode and a second operational mode, and wherein during said first operational mode said barrier control device may be actuated to close said barrier without regard to whether said predetermined delay has lapsed, and wherein during said second operation mode said barrier control device may be actuated to close said barrier only after said predetermined delay has lapsed.

46. The system of claim 40 wherein said control signal further includes directional information and said stationary transceiver is further to,
store user-defined directional information,
compare both the directional information and the position information in said control signal to said user-defined directional information and user-defined position information, and if there is a match, actuate the barrier control device, and
transmit a notification signal to said mobile transceiver indicating that said barrier control device is being actuated.

47. The system of claim 46 wherein said user-defined directional information and user-defined position information is programmable into a memory of said stationary transceiver during a program mode.

48. The system of claim 46 wherein said user-defined directional information includes a plurality of direction values corresponding to directions of movement for said mobile transceiver, and said user-defined position information includes position coordinates for said mobile transceiver for each of a plurality of reception regions.

49. The system of claim 40 wherein said control signal is one of a radio frequency signal and a spread spectrum signal.

50. The system of claim 40 wherein said identification information includes a mobile transceiver ID code, and said stationary transceiver is further to compare said mobile transceiver ID code in said control signal to a pre-programmed mobile transceiver ID code in a memory of said stationary transceiver.

51. The system of claim 40, further comprising a plurality of stationary transceivers, wherein each of said plurality of stationary transceiver are to,
receive said control signal from said mobile transceiver,
provide said control signal to said stationary transceiver so that said stationary transceiver can compare the position information in said control signal to said user-defined position information, and if there is a match, actuate the barrier control device, and
transmit a notification signal to said mobile transceiver indicating that said barrier is being actuated.

52. The system of claim 51 wherein said plurality of stationary transceivers are slave units, and wherein said stationary transceiver uses position information provided by said plurality of stationary transceivers to determine if said barrier control device should be actuated.

53. The system of claim 40 wherein said stationary transceiver is in communication with said barrier control device using one of a hardwired connection and a wireless connection.

* * * * *